(12) United States Patent
Zellner et al.

(10) Patent No.: US 8,718,007 B2
(45) Date of Patent: *May 6, 2014

(54) SYSTEM AND METHOD FOR DYNAMIC ALLOCATION OF CAPACITY ON WIRELESS NETWORKS

(75) Inventors: Samuel N. Zellner, Dunwoody, GA (US); Mark J. Enzmann, Roswell, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/586,962

(22) Filed: Aug. 16, 2012

(65) Prior Publication Data

US 2012/0307786 A1 Dec. 6, 2012

Related U.S. Application Data

(63) Continuation of application No. 12/144,050, filed on Jun. 23, 2008, now Pat. No. 8,265,018, which is a continuation of application No. 11/248,857, filed on Oct. 12, 2005, now Pat. No. 7,420,981, which is a continuation of application No. 09/559,594, filed on Apr. 28, 2000, now Pat. No. 7,050,445, which is a continuation-in-part of application No. 08/903,534, filed on Jul. 30, 1997, now Pat. No. 6,069,882.

(51) Int. Cl.
*H04W 72/10* (2009.01)
*H04W 4/00* (2009.01)

(52) U.S. Cl.
USPC .......................................................... 370/329

(58) Field of Classification Search
USPC .......................................................... 370/329
See application file for complete search history.

(56) References Cited

U.S. PATENT DOCUMENTS

| 4,736,366 A | 4/1988 | Rickard |
| 4,803,679 A | 2/1989 | Shimizu |

(Continued)

FOREIGN PATENT DOCUMENTS

| EP | 0370826 | 5/1990 |
| EP | 0717579 | 6/1996 |

(Continued)

OTHER PUBLICATIONS

In the Matter of "The Development of Operational, Technical and Spectrum Requirements for Meeting Federal, State and Local Public Safety Agency Communication Requirements Through the Year 2010," Federal Communications Commission FCC 00-242, Second Report and Order, Adopted Jul. 3, 2000, Released Jul. 13, 2000.

(Continued)

*Primary Examiner* — Brandon Renner
*Assistant Examiner* — Faisal Choudhury
(74) *Attorney, Agent, or Firm* — Hartman & Citrin LLC (57) ABSTRACT

A wireless communication system is described for allocating limited network access according to priorities designated for requested transactions of wireless communications. The wireless network has a number of access links for transmitting transactions for wireless communications. A plurality of wireless communications devices requests transmission of transactions on the wireless network. A designated priority level is associated with each transaction. In response to the transaction requests, an access control manager in the wireless network schedules transmission of transactions when all of the plurality of access links are occupied, by authorizing a transmission of a transaction of higher priority than another transaction that is being transmitted, and discontinuing the transmission of the transaction of lower priority.

20 Claims, 8 Drawing Sheets

(56) References Cited

U.S. PATENT DOCUMENTS

| | | | |
|---|---|---|---|
| 5,054,109 A * | 10/1991 | Blackburn | 455/17 |
| 5,131,020 A | 7/1992 | Liebesny et al. | |
| 5,157,659 A | 10/1992 | Schenkel | |
| 5,157,709 A | 10/1992 | Ohteru | |
| 5,226,071 A | 7/1993 | Bolliger et al. | |
| 5,343,511 A | 8/1994 | Osada | |
| 5,404,355 A | 4/1995 | Raith | |
| 5,457,735 A | 10/1995 | Erickson | |
| 5,513,242 A | 4/1996 | Mukerjee et al. | |
| 5,519,709 A * | 5/1996 | Albrecht et al. | 370/407 |
| 5,521,925 A | 5/1996 | Merakos et al. | |
| 5,539,729 A | 7/1996 | Bodnar | |
| 5,539,923 A | 7/1996 | Matsumoto | |
| 5,570,411 A | 10/1996 | Sicher | |
| 5,574,977 A | 11/1996 | Joseph et al. | |
| 5,583,869 A | 12/1996 | Grube et al. | |
| 5,590,397 A * | 12/1996 | Kojima | 455/417 |
| 5,615,249 A | 3/1997 | Solondz et al. | |
| 5,666,348 A * | 9/1997 | Thornberg et al. | 370/230 |
| 5,678,179 A | 10/1997 | Turcotte et al. | |
| 5,694,455 A | 12/1997 | Goodman | |
| 5,708,968 A | 1/1998 | Suzuki | |
| 5,729,541 A | 3/1998 | Hamalainen | |
| 5,732,073 A | 3/1998 | Kusaki et al. | |
| 5,742,588 A | 4/1998 | Thornberg et al. | |
| 5,742,592 A | 4/1998 | Scholefield et al. | |
| 5,752,193 A * | 5/1998 | Scholefield et al. | 455/452.2 |
| 5,754,537 A * | 5/1998 | Jamal | 370/330 |
| 5,761,618 A | 6/1998 | Lynch et al. | |
| 5,784,569 A | 7/1998 | Miller et al. | |
| 5,787,080 A | 7/1998 | Hulyalkar et al. | |
| 5,787,358 A | 7/1998 | Takahashi | |
| 5,790,522 A | 8/1998 | Fichou et al. | |
| 5,794,156 A | 8/1998 | Alanara | |
| 5,812,656 A | 9/1998 | Garland et al. | |
| 5,832,384 A | 11/1998 | Balachandran et al. | |
| 5,857,018 A | 1/1999 | Sumner et al. | |
| 5,862,485 A | 1/1999 | Linneweh, Jr. et al. | |
| 5,862,488 A * | 1/1999 | Kotzin et al. | 455/510 |
| 5,867,790 A | 2/1999 | Hamada | |
| 5,909,651 A * | 6/1999 | Chander et al. | 455/466 |
| 5,914,945 A | 6/1999 | Abu-Amara et al. | |
| 5,926,469 A | 7/1999 | Norstedt et al. | |
| 5,930,239 A | 7/1999 | Turcotte | |
| 6,009,331 A | 12/1999 | Ueda | |
| 6,026,289 A | 2/2000 | Zellner et al. | |
| 6,067,457 A | 5/2000 | Erickson et al. | |
| 6,069,882 A | 5/2000 | Zellner et al. | |
| 6,091,709 A | 7/2000 | Harrison et al. | |
| 6,091,717 A | 7/2000 | Honkasalo et al. | |
| 6,097,700 A | 8/2000 | Thornberg et al. | |
| 6,101,389 A | 8/2000 | Koizumi et al. | |
| 6,124,878 A | 9/2000 | Adams et al. | |
| 6,175,621 B1 | 1/2001 | Begeja | |
| 6,192,112 B1 | 2/2001 | Rapaport et al. | |
| 6,192,248 B1 | 2/2001 | Solondz | |
| 6,201,966 B1 | 3/2001 | Rinne et al. | |
| 6,226,277 B1 | 5/2001 | Chuah et al. | |
| 6,282,429 B1 | 8/2001 | Baiyor et al. | |
| 6,295,284 B1 | 9/2001 | Maggenti | |
| 6,304,578 B1 | 10/2001 | Fluss | |
| 6,321,093 B1 | 11/2001 | Dalal | |
| 6,327,364 B1 | 12/2001 | Shaffer et al. | |
| 6,335,922 B1 | 1/2002 | Tiedemann, Jr. et al. | |
| 6,363,065 B1 | 3/2002 | Thornton et al. | |
| 6,377,548 B1 | 4/2002 | Chuah | |
| 6,421,335 B1 | 7/2002 | Kilkki et al. | |
| 6,434,380 B1 | 8/2002 | Andersson et al. | |
| 6,470,024 B1 | 10/2002 | Haemaelaeinen et al. | |
| 6,519,260 B1 | 2/2003 | Galyas et al. | |
| 6,522,653 B1 | 2/2003 | Kilkki | |
| 6,549,938 B1 | 4/2003 | Kilkki et al. | |
| 6,567,416 B1 | 5/2003 | Chuah | |
| 6,587,433 B1 | 7/2003 | Borella et al. | |
| 6,665,293 B2 | 12/2003 | Thornton et al. | |
| 6,856,628 B1 | 2/2005 | Bychowsky et al. | |
| 6,885,657 B1 | 4/2005 | Rabenko et al. | |
| 6,901,209 B1 | 5/2005 | Cooper et al. | |
| 7,046,643 B1 | 5/2006 | Zellner et al. | |
| 7,050,445 B1 | 5/2006 | Zellner et al. | |
| 7,065,061 B1 | 6/2006 | Zellner et al. | |
| 7,207,055 B1 | 4/2007 | Hendricks et al. | |
| 7,209,437 B1 | 4/2007 | Hodgkinson et al. | |
| 7,349,333 B2 | 3/2008 | Zellner | |
| 7,420,981 B2 | 9/2008 | Zellner et al. | |
| 7,457,613 B1 * | 11/2008 | Leuca et al. | 455/414.1 |
| 7,463,604 B2 | 12/2008 | Zellner et al. | |
| 7,844,290 B2 | 11/2010 | Park | |
| 7,936,744 B2 | 5/2011 | Rabenko et al. | |
| 7,970,107 B2 | 6/2011 | Tal et al. | |
| 2003/0037146 A1 | 2/2003 | O'Neill | |
| 2008/0165731 A1 | 7/2008 | Zellner | |
| 2008/0259864 A1 | 10/2008 | Zellner et al. | |
| 2009/0088130 A1 | 4/2009 | Zellner et al. | |

FOREIGN PATENT DOCUMENTS

| | | |
|---|---|---|
| EP | 0752793 | 1/1997 |
| WO | 9711566 | 5/1997 |
| WO | 9716040 | 5/1997 |

OTHER PUBLICATIONS

"Radio Equipment and Systems (RES); Trans-European Trunked Radio (TETRA); Voice plus Data (V+D); Part 1: General network design," European Telecommunications Standards Institute, ETS 300 392-1, Feb. 1996.

"Radio Equipment and Systems (RES); Trans-European Trunked Radio (TETRA); Voice plus Data (V+D); Part 10: Supplementary Services stage 1; Part 10-01: Call identification" European Telecommunications Standards Institute, ETS 300 392-10-01, Apr. 1996.

"Radio Equipment and Systems (RES); Trans-European Trunked Radio (TETRA); Voice plus Data (V+D); Part 10: Supplementary Services stage 1; Part 10-09: Access priority" European Telecommunications Standards Institute, ETS 300 392-10-09, Apr. 1996.

"Radio Equipment and Systems (RES); Trans-European Trunked Radio (TETRA); Voice plus Data (V+D); Part 10: Supplementary Services stage 1; Part 10-16: Pre-emptive priority call" European Telecommunications Standards Institute, ETS 300 392-10-16, Apr. 1996.

"Radio Equipment and Systems (RES); Trans-European Trunked Radio (TETRA); Voice plus Data (V+D); Part 2: Air Interference (AI)," European Telecommunications Standards Institute, ETS 300 392-2, Mar. 1996.

"Radio Equipment and Systems (RES); Trans-European Trunked Radio (TETRA); User requirements for Subscriber Identity Module (SIM)" European Telecommunications Standards Institute, ETR 295, Aug. 1996.

"Radio Equipment and Systems (RES); Trans-European Trunked Radio system (TETRA); Voice plus Data (V+D) Open channel" European Telecommunications Standards Institute, ETR 120, Nov. 1994.

"Terrestrial Trunked Radio (TETRA); Voice plus Data (V+D); Designers' guide; Part 1: Overview, technical description and radio aspects ," European Telecommunications Standards Institute, ETR 300-1, May 1997.

"Terrestrial Trunked Radio (TETRA); Voice plus Data (V+D); Part 11: Supplementary services stage 2; Sub-part 16: Pre-emptive Priority Call (PPC)," European Telecommunications Standards Institute, ETS 300 392-11-16, Sep. 2000.

"Terrestrial Trunked Radio (TETRA); Voice plus Data (V+D); Part 12: Supplementary services stage 3; Sub-part 16: Pre-emptive Priority Call (PPC)," European Telecommunications Standards Institute, final draft ETSI EN 300 392-12-16 v1.2.0 (May 2004).

"Trans European Trunked Radio (TETRA) system; Technical requirements specification Part 1: Voice plus Data (V+D) systems; " European Telecommunications Standards Institute, ETR 086-1, Jan. 1994.

(56) References Cited

OTHER PUBLICATIONS

"Universal Mobile Telecommunications System (UMTS); UTRAN Iu Interface RANAP Signaling (3G TS 25.413 version 3.0.0 Release 1999)," ETSI TS 125 413 V3.0.0 (Jan. 2000).
U.S. Office Action dated Sep. 5, 2003 in U.S. Appl. No. 09/559,594.
U.S. Office Action dated Feb. 24, 2004 in U.S. Appl. No. 09/559,594.
U.S. Notice of Allowance dated Aug. 5, 2004 in U.S. Appl. No. 09/559,594.
U.S. Notice of Allowance dated Apr. 27, 2005 in U.S. Appl. No. 09/559,594.
U.S. Office Action dated Oct. 25, 2002 in U.S. Appl. No. 09/922,042.
U.S. Office Action dated May 8, 2003 in U.S. Appl. No. 09/922,042.
U.S. Office Action dated Dec. 8, 2003 in U.S. Appl. No. 09/922,042.
U.S. Notice of Allowance dated Aug. 5, 2004 in U.S. Appl. No. 09/922,042.
U.S. Notice of Allowance dated Mar. 21, 2005 in U.S. Appl. No. 09/922,042.
U.S. Office Action dated Feb. 5, 2001 in U.S. Appl. No. 09/579,000.
U.S. Office Action dated Sep. 4, 2003 in U.S. Appl. No. 09/559,593.
U.S. Office Action dated Feb. 17, 2004 in U.S. Appl. No. 09/559,593.
U.S. Notice of Allowance dated Sep. 3, 2004 in U.S. Appl. No. 09/559,593.
U.S. Notice of Allowance dated Apr. 5, 2005 in U.S. Appl. No. 09/559,593.
U.S. Office Action dated Nov. 22, 2006 in U.S. Appl. No. 11/248,857.
U.S. Office Action dated Jun. 8, 2007 in U.S. Appl. No. 11/248,857.
U.S. Office Action dated Nov. 26, 2007 in U.S. Appl. No. 11/248,857.
U.S.. Notice of Allowance dated Feb. 21, 2008 in U.S. Appl. No. 11/248,857.
U.S. Office Action dated Apr. 30, 2007 in U.S. Appl. No. 11/248,858.
U.S. Office Action dated Oct. 5, 2007 in U.S. Appl. No. 11/248,858.
U.S. Office Action dated Apr. 2, 2008 in U.S. Appl. No. 11/248,858.
U.S. Notice of Allowance dated Aug. 19, 2008 in U.S. Appl. No. 11/248,858.
U.S. Office Action dated Apr. 30, 2007 in U.S. Appl. No. 10/663,087.
U.S. Notice of Allowance dated Oct. 17, 2007 in U.S. Appl. No. 10/663,087.
U.S. Office Action dated Jul. 16, 2006 in U.S. Appl. No. 11/960,434.
U.S. Office Action dated Mar. 8, 2011 in U.S. Appl. No. 12/052,147.
U.S. Office Action dated Aug. 12, 2011 in U.S. Appl. No. 12/052,147.
U.S. Office Action dated Apr. 25, 2012 in U.S. Appl. No. 12/052,147.
U.S. Office Action dated Apr. 22, 2011 in U.S. Appl. No. 12/144,050.
U.S. Office Action dated Sep. 30, 2011 in U.S. Appl. No. 12/144,050.
U.S. Notice of Allowance dated Dec. 28, 2011 in U.S. Appl. No. 12/144,050.
U.S. Notice of Allowance dated Jan. 6, 2012 in U.S. Appl. No. 12/144,050.
U.S. Notice of Allowance dated May 25, 2012 in U.S. Appl. No. 12/144,050.
U.S. Office Action dated Jul. 19, 2011 in U.S. Appl. No. 12/331,101.
U.S. Office Action dated Apr. 3, 2012 in U.S. Appl. No. 12/331,101.
EP Search Report dated Apr. 11, 2005 in EP Application No. 04078485.2.
International Search Report & Written Opinion dated Jan. 21, 1999 in PCT Application No. PCT/US98/15568.
"Differential Channel Allocation" Function Specification 3/155 17-ANT 240 07 Uen B.
Data Communications (Tech Tutorials) "Going the Distance with QOS", Mick Seaman and Bob Klessig, 3Com Corp., Feb. 1999.
Data Communications (Tech Tutorials) "Serving Up QOS End to End", Marguerite Reardon, Nov. 21, 1998.
Data Communications (Tech Tutorials) "The Policy Makers", Stephen Saunders, May 1999.
"Digital Cellular Telecommunications System (Phase 2); Specification of the Subscriber Identity Module-Mobile Equipment (SIM-ME) interface (GSM 11.11 version 4.19.1)," European Telecommunication Standard, ETS 300 608, Jan. 1998.
"Digital Cellular Telecommunications System (Phase 2+); High Speed Circuit Switched Data (HSCSD)—Stage 1 (GSM 02.34)," Global System for Mobile Communication, ETSI GSM 02.34 V5.1.0, Mar. 1997.
"Digital Cellular Telecommunications System (Phase 2+); High Speed Circuit Switched Data (HSCSD)—Stage 2 (GSM 03.34)," Global System for Mobile Communication, TS 101 038 V5.0.1 (Apr. 1997).
"Digital Cellular Telecommunications System (Phase 2+) (GSM); Universal Mobile Telecommunications System (UMTS); Enhanced Multi-Level Precedence and Pre-emption Service (eMLPP)—Stage 1 (3G TS 22.067 version 3.0.1 Release 1999)," Global System for Mobile Communication, ETSI TS 122 067 V3.0.1 (Jan. 2000).
"Digital Cellular Telecommunications System (Phase 2+) (GSM); Universal Mobile Telecommunications System (UMTS); enhanced Multi-Level Precedence and Pre-emption Service (eMLPP)—Stage 2 (3G TS 23.067 version 3.0.0 Release 1999)," Global System for Mobile Communication, ETSI TS 123 067 3.0.0 v3.0.0 (Jan. 2000).
"Digital Cellular Telecommunications System (Phase 2+) (GSM); Universal Mobile Telecommunications System (UMTS); enhanced Multi-Level Precedence and Pre-emption Service (eMLPP)—Stage 3 (3G TS 24.067 version 3.0.0 Release 1999)," Global System for Mobile Communication, ETSI TS 124 067 3.0.0 v3.0.0 (Jan. 2000).
"Digital Cellular Telecommunications System (Phase 2+) (GSM); Universal Mobile Telecommunications System (UMTS); Service Accessibility (3G TS 22.011 version 3.1.0 Release 1999)," Global System for Mobile Communication, ETSI TS 122 011 V3.1.0 (Jan. 2000).
"Digital Cellular Telecommunications System (Phase 2+); Enhanced Multi-Level Precedence and Pre-emption Service (eMLPP)—Stage 1 (GSM 02.67)," European Telecommunications Standards Institute, Global System for Mobile Communications Technical Specification, Version 5.0.1, Jul. 1996.
"Digital Cellular Telecommunications System (Phase 2+) Mobile Services Switching Centre-Base Station System (MSC-BSS) Interface; Layer 3 Specification (GSM 08.08)," European Telecommunications Standards Institute, Global System for Mobile Communications Technical Specification, Version 5.4.0, Nov. 1996.
U.S. Office Action dated Nov. 21, 2012 in U.S. Appl. No. 12/052,147.
U.S. Office Action dated Nov. 7, 2012 in U.S. Appl. No. 12/331,101.
U.S. Office Action mailed Apr. 24, 2013, in U.S. Appl. No. 12/331,101.
U.S. Appl. No. 12/052,147 Office Action dated Aug. 28, 2013.
U.S. Appl. No. 12/052,147 Office Action mailed Feb. 10, 2014.

* cited by examiner

| | | | | |
|---|---|---|---|---|
| Carrier | x | 2 | 3 | 4 |
| Application Developer | 1 | 2 | 3 | x |
| Customer | x | 2 | 3 | x |
| Available Priority | | 2 | 3 | |

Figure 5B

| | | | | |
|---|---|---|---|---|
| Carrier | x | x | x | 4 |
| Application Developer | 1 | 2 | 3 | 4 |
| Customer | x | x | x | 4 |
| Available Priority | | | | 4 |

Figure 5C

| | | | | |
|---|---|---|---|---|
| Carrier | 1 | 2 | 3 | 4 |
| Application Developer | 1 | 2 | 3 | x |
| Customer | 1 | 2 | 3 | x |
| Available Priority | 1 | 2 | 3 | |

Figure 6A

| Time | Handset Queue (in data packets) | Handset Side | Direction | Cell Side |
|---|---|---|---|---|
| 1 | 5 | Send control packet | → | Receive Control Packet |
| 2 | 5 | — | | Evaluate Cell Capacity |
| 3 | 5 | — | | Discontinue Lower Priority Transaction |
| 4 | 5 | Receive Authorization | ← | Send Authorization to Handset |
| 5 | 4 | Send Data Packet | → | Receive Data packet (Store in a buffer) |
| 6 | 3 | Send Data Packet | → | Receive Data Packet |
| 7 | 2 | Send Data Packet | → | Receive Data Packet |
| 8 | 2 | Receive Discontinue Message | ← | Generate Discontinue Message |
| 9 | 2 | — | | Provide Access to Other Handsets |
| 10 | 2 | Receive Broadcast Message | ← | Broadcast Available Capacity |
| 11 | 2 | Send Control Packet | → | Receive Request |
| 12 | 2 | Receive Authorization | ← | Send Authorization |
| 13 | 1 | Send Data Packet | → | Receive Data Packet |
| 14 | 0 | Send Data Packet | → | Receive Data Packet |

Figure 6B

| Time | Handset A | Other Handsets | Cell Side |
|---|---|---|---|
| 1 | Sent Control Packet | Send Control Packet | Receive Control Packets |
| 2 | Receive Authorization | — | Send Authorization to Handset A |
| 3 | Send Data Packet | Receive Authorization | Receive Packet from "A"/Send Authorization to "Other" |
| 4 | — | Send Data Packet | Receive Packet from "Other" |
| 5 | Send Data Packet | Send Control Packet | Receive Data from "A" Receive Request from "Other" |
| 6 | Receive Data Packet | Receive Authorization | Send Incoming Packet to "A", & Authorization to "Other" |
| 7 | — | Send Data Packet | Receive Data Packet from "Other" |

Figure 7

SYSTEM AND METHOD FOR DYNAMIC ALLOCATION OF CAPACITY ON WIRELESS NETWORKS

CROSS-REFERENCE TO RELATED APPLICATIONS

This application is a continuation of U.S. application Ser. No. 12/144,050, now U.S. Pat. No. 8,265,018, entitled "System and Method for Dynamic Allocation of Capacity on Wireless Networks" filed Jun. 23, 2008, which is a continuation of U.S. application Ser. No. 11/248,857, now U.S. Pat. No. 7,420,981, entitled "System and Method for Dynamic Allocation of Capacity on Wireless Networks" filed Oct. 12, 2005, which is a continuation of U.S. application Ser. No. 09/559,594, now U.S. Pat. No. 7,050,445, entitled "System and Method for Dynamic Allocation of Capacity on Wireless Networks" filed Apr. 28, 2000, which is a continuation-in-part of U.S. application Ser. No. 08/903,534, now U.S. Pat. No. 6,069,882, entitled "System and Method for Providing Data Services Using Idle Cell Resources" filed Jul. 30, 1997, which are all incorporated herein by reference in their entireties. This application also incorporates by reference in its entirety U.S. Pat. No. 7,046,643 entitled "Method for Dynamic Multi-Level Pricing for Wireless Communication According to Quality of Service" filed Apr. 28, 2000.

FIELD OF THE INVENTION

The present invention relates to wireless communication services, and more particularly, to a system and method for dynamic allocation of limited capacity on a wireless network.

BACKGROUND OF THE INVENTION

Through the combination of wireless telephony and mobile computing technologies, digital wireless handsets are now available that can allow users to communicate with others by voice, e-mail, paging, facsimile, etc., and to transmit or receive information through the internet over a wireless network. Manufacturers of internet-capable telephones and personal digital assistants (PDA's) are coordinating with internet web site content providers to develop specialized versions of popular web sites for wireless access and interaction. In almost any location, while stationary or while in motion, consumers can use wireless networks to browse the worldwide web, participate in e-commerce transactions, join others through interactive game software, or communicate with others by voice or by other means through transmission of data.

In cellular communications over circuit-switched wireless networks, a link is established through radio signals over channels between a mobile transmitter/receiver and a nearby cell tower. Circuit-switched networks maintain a continuing or dedicated connection throughout the duration of a communication. This is known to be inefficient for "bursty" type communications, because the dedicated lines occupy the limited bandwidth in the network for the duration of the communication, even during periods of time when information signals are not being transmitted. The circuit-switched protocol is also inefficient for voice communications, because there are gaps of silence in most voice communications in which no signal needs to be transmitted.

In packet switched networks, data is divided into 'envelopes' of information that contain address, error checking, and user data. If a data communication is not continuous, as is typically the case, the communications link can be occupied by packets from other communications during the periods of downtime. In a packet switched wireless network, information is transmitted to and from mobile transmitter/receivers through radio signals in the format of discrete packets, instead of through a continuous communications link. The packets are assembled together when received to reconstruct the communication, which is a "transaction." Therefore, portions of multiple different data communications can be transmitted along the same communications link, instead of waiting for one communication to end before another can begin.

For wireless communications, a bottleneck occurs during busy periods that can slow down communications because there are a limited number of access points into the wireless network. When a packet switched wireless network is operating near capacity, the mobile transmitters/receivers may have to wait before sending or receiving packets for communications. While a transmission delay may not be significant for an e-mail communication or a file transfer, the delay is probably not acceptable for voice-over-IP telephony or other time-sensitive communications. Accordingly, problems exist when sending or receiving urgent data over packet switched wireless networks during busy periods of network congestion.

SUMMARY OF THE INVENTION

The present invention allocates network access for transactions in a wireless network according to the priority levels associated with the transactions. When all access links are occupied on the wireless network, an access control manager in the wireless network discontinues transmission of a low priority transaction in favor of a higher priority transaction. When a transaction is discontinued, the transaction data that was not transmitted is maintained in a data buffer. When the transaction is resumed later, the remaining transaction data is removed from the data buffer. There can be data remaining in the data buffer from several different transactions of different priorities. Requests to resume transactions occur in an order according to the relative priority designated for the different transactions in the data buffer.

A wireless handset, or a wireless communications device, generates transactions through user applications operating in the handset. The transactions can have a default priority level, or the priority levels can be selected by the user. E-mail and voice-over-IP transactions are discussed, wherein the transaction is periodically discontinued, or suspended, in favor of a higher priority transaction.

In accordance with the present invention, a wireless communication system is described for allocating limited network access according to priorities designated for requested transactions of wireless communications. The wireless network has a number of access links for transmitting transactions for wireless communications. A plurality of wireless communications devices request transmission of transactions on the wireless network. A designated priority level is associated with each transaction. In response to the transaction requests, an access control manager in the wireless network schedules transmission of transactions when all of the plurality of access links are occupied, by authorizing a transmission of a transaction of higher priority than another transaction that is being transmitted, and discontinuing the transmission of the transaction of lower priority.

The present invention also provides a wireless communications device for use in a wireless communication system. The communications device includes at least one user application configured to send data to a wireless network or receive data from the wireless network as part of a transaction. A data buffer in the wireless communications device stores transaction data to be sent by the user application before transmission along the wireless network. A communications manager in the wireless communications device generates a control message to be transmitted to the wireless network to request transmission of a transaction. The control message includes an identification code for the wireless communications device and a priority level associated with the transaction.

DETAILED DESCRIPTION OF THE PREFERRED EMBODIMENTS OF THE INVENTION

Figure 1:
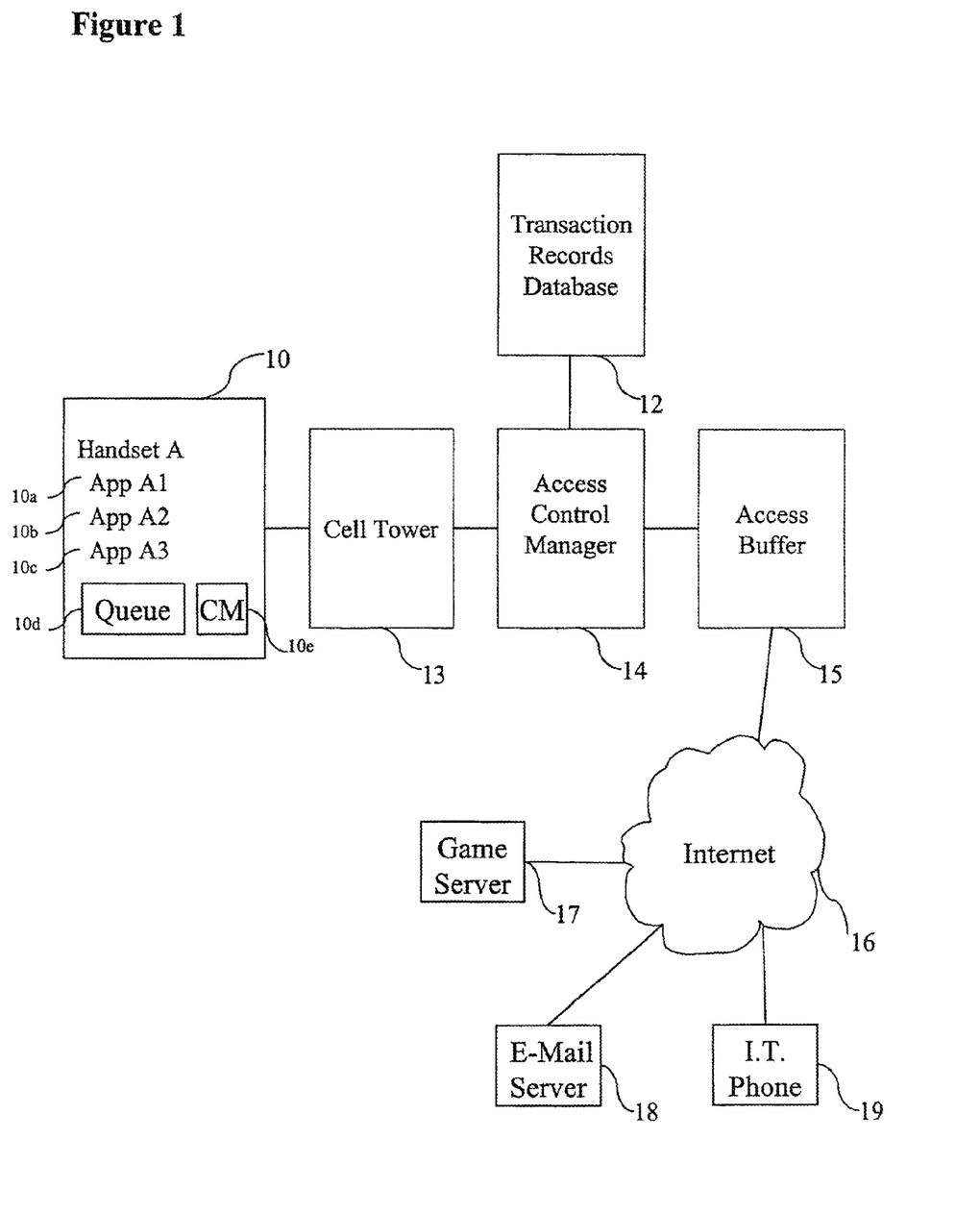
FIG. 1 is a schematic diagram of a wireless communication system according to the preferred embodiment of the present invention.

FIG. 1 is a schematic diagram of the multi-level wireless network service of the present invention. Mobile transmitter/receiver handsets, such as a handset 10, are physically located in close proximity to cell tower 13, which is part of a packet switched wireless network. Each handset is capable of supporting at least one or any number of applications, and contains a queue, or buffer, for temporarily storing data packets to be communicated to cell tower 13. A communications manager in the handset stores control information to be transmitted to cell tower 13 to initiate a wireless communication. For example, Handset A 10 is capable of running at least three applications, App. A1, App. A2, and App. A3, labeled 10a-10c, respectively, and contains queue 10d and communications manager 10e. Cell tower 13 transmits and receives radio frequency signals within a general region or cell.

The handsets may be portable, such as cellular telephones, PDA's, or portable game systems, or any other mobile communications unit. However, the present invention can also be used with any device capable of engaging in wireless communications, which may also be fixed, or integrated into an immovable object.

Cell tower 13 is in communication with access control manager 14. Access control manager 14 communicates with a plurality of cell towers to control access to the wireless network. Access control manager 14 may be regionally located, as one of several access control managers on a network, or may be centrally located for the entire network. Access control manager 14 communicates with access buffer 15, which stores data received from the internet 16 before it is transmitted on the wireless network. The internet can be operatively connected to a variety of servers, such as interactive game server 17, e-mail server 18, and voice-over-IP telephone server 19.

The applications supported by the handsets are configured to communicate with the wireless network at one or more priority levels. The applications may include services such as e-mail, instant mail, unified messaging, short messaging, paging, world-wide web browsing, pointcast, interactive action games, internet telephony, internet facsimile, file transfer, etc. The priority levels are used by the access control manager 14 in the wireless network to determine the relative order of access to the wireless network for different applications during periods of congestion. Each application may have a default priority level. For example, internet telephony applications, which require rapid transmission of data packets in order to carry a natural-sounding voice communication, will likely have a higher default priority level than an e-mail application, which can usually be delayed without a noticeable effect.

To provide dynamic quality of service adjustments, many applications can be configured to operate at several different priority levels according to the relative importance of a particular transaction to a user. As an example, a user may request to send an e-mail at a higher priority than the default level, when the e-mail contains time sensitive information and the delivery time is critical. By charging users for access to the network according to the priority level for each transaction, the users have a financial incentive to reserve designating high priority transactions for applications for which quick transmission is important. The priority levels can also be associated with control mechanisms in other networks, both wired and wireless, to provide end-to-end quality of service capability. For example, for wireless devices that are capable of Internet access, the priority levels can affect the quality of service across both the wireless network and the Internet network.

Figure 2:
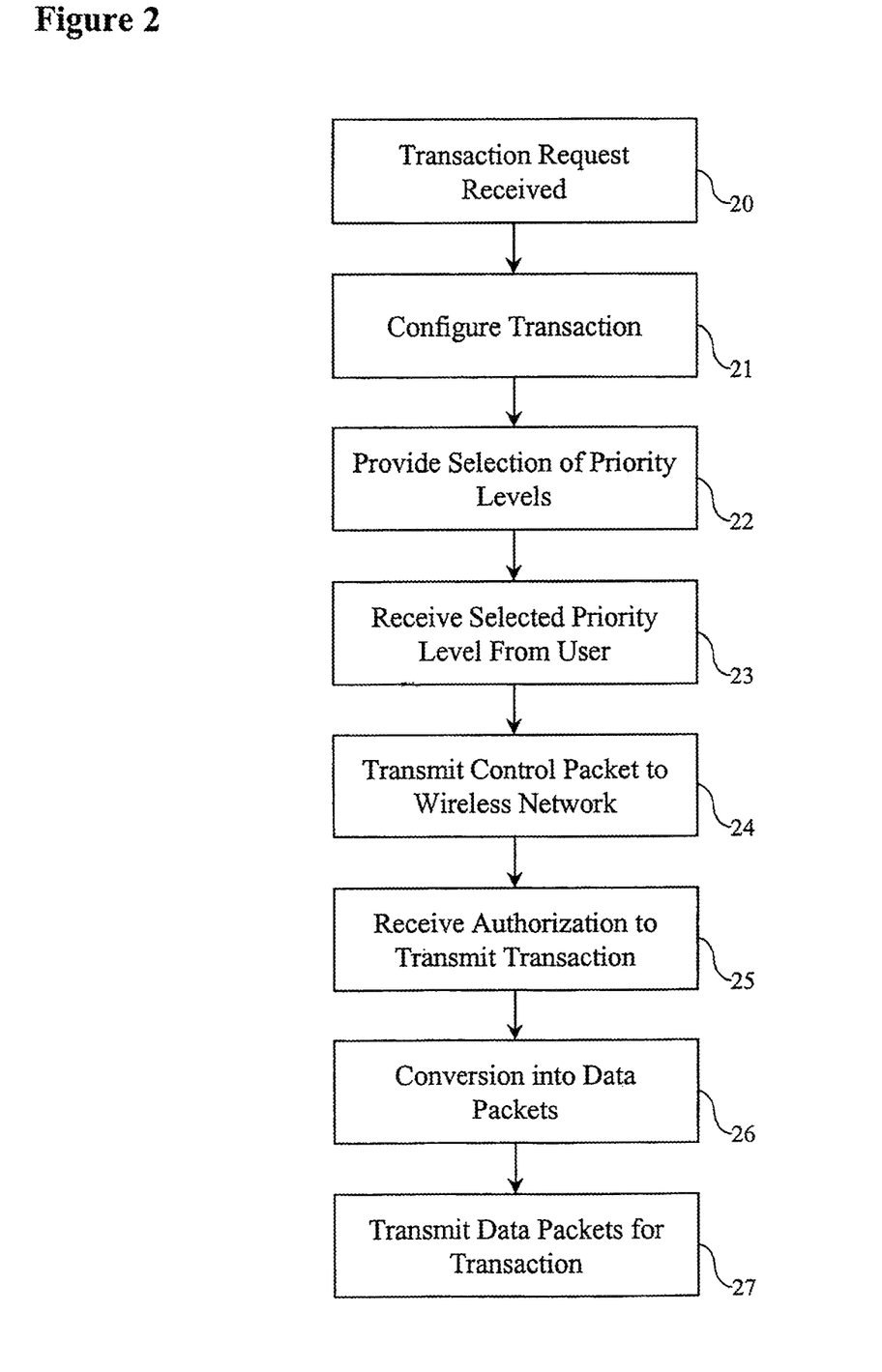
FIG. 2 is a flow diagram of the steps for configuring a transaction for transmission on the wireless network according to the preferred embodiment of the present invention.

FIG. 2 provides a flow diagram of the steps for initiating a transaction from an application in a handset to transmit data along the wireless network, from the perspective of a controller in a handset. In step 20, a transaction request is received from a user application in a handset. As discussed above, this transaction request could relate to sending or receiving an e-mail, engaging in voice-over-IP, receiving a file transfer, etc. The handset next detects in step 21 whether the transaction that is requested is at the default priority or at a user-specified priority. A control packet(s) is configured according to the requested priority or default priority level in steps 22 and 23, respectively. The control packets might include bits for any or all of the following: establish connection, desired data rate, priority level, symmetric or asymmetric transmission, encryption on/off, acceptable delay, estimated quantity of data to transmit or expect duration, destination point of session (IP address), originating device ID, etc.

In step 24, the data in the user application that is to be transmitted is transferred or coded as a series of packets and placed into a queue in the handset. In step 25, the control packet(s) is then transmitted by a radio signal to the nearby cell tower to send a transaction request to the access control manager. The control packet includes an identification code for the handset and the priority level for the transaction.

If, from the user's perspective, the transaction is a single event, such as sending an e-mail communication, the handset allows the user to engage in other activities once the e-mail communication is placed in the queue. The subsequent transmission of the plurality of data packets in the queue, either individually or in groups, can occur transparently to the user. When the last data packet is transmitted over the wireless network, the user will be notified that the transaction was successful. On the other hand, if the transaction request is for a series of transmissions, such as in a voice communication, the handset will provide an indication when the user has the requested access to the network.

Figure 3:
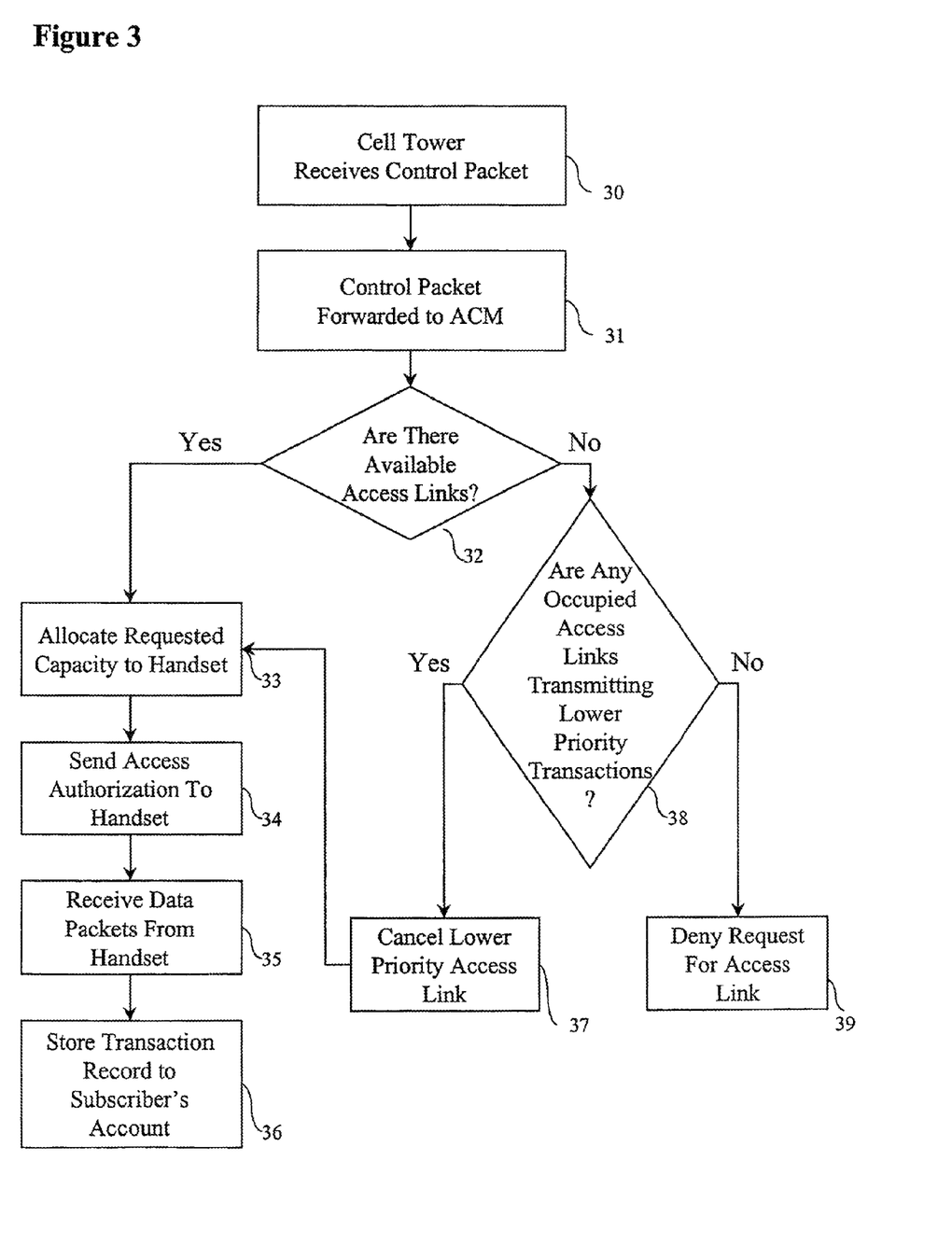
FIG. 3 is a flow diagram of the steps for transmitting a transaction on the wireless network from a wireless communications device according to the preferred embodiment of the present invention.

FIG. 3 describes how the wireless service responds to the transmission request. In step 30, the cell tower receives a control packet transmitted by the handset. Generally, the cell tower reserves capacity for transmission of control packets between itself and the handsets to indicate when authorization is granted for transactions. However, when the cell tower is completely at or beyond full capacity, handsets may temporarily be unable to transmit control packets to the cell tower, which will be indicated by a "busy" signal during those times.

The cell tower forwards a control packet with a transmission request to the access control manager in step 31. The control manager then performs an evaluation of the existing capacity on the wireless network, in step 32. If there is an available access link, the requested capacity is allocated to the handset for the transaction, in step 33. The access control manager then sends access authorization to the corresponding cell tower to be transmitted to the handset in step 34. The handset begins transmission of the data packets in its queue, which are received by the cell tower in step 35. The packets are then forwarded to the Internet in step 36, and a confirmation is sent to the handset to complete the transmission for the transaction.

When there are no available access links on the wireless network, the access control manager next evaluates in step 38 whether there are any occupied access links that are transmitting packets for transactions of lower priority than the pending transaction request. If there is a lower priority transmission occurring, the access control manager performs a series of operations, in step 37, to discontinue the lower priority transaction in favor of a higher priority transmission. A signal is sent via a control packet to the handset that is engaged in the lower priority data packet transmission. The signal indicates to that handset transmitter/receiver that access to the wireless network is suspended. The access control manager then allocates the requested capacity for the higher priority transmission, in step 33, and authorizes the handset to send data packets in step 34. The wireless network then receives the data packets in step 35, which are forwarded to the internet in step 36.

If there is no lower priority transmission that is occurring, the access control manager sends a data packet to the requesting handset to deny the request for an access link in step 39. A handset whose transaction is discontinued in favor of a transaction with higher priority operates in the same manner as a handset that is denied access from the outset. The wireless network can be configured in several manners for responding to a denial of network access, as will be further described below.

Figure 4:
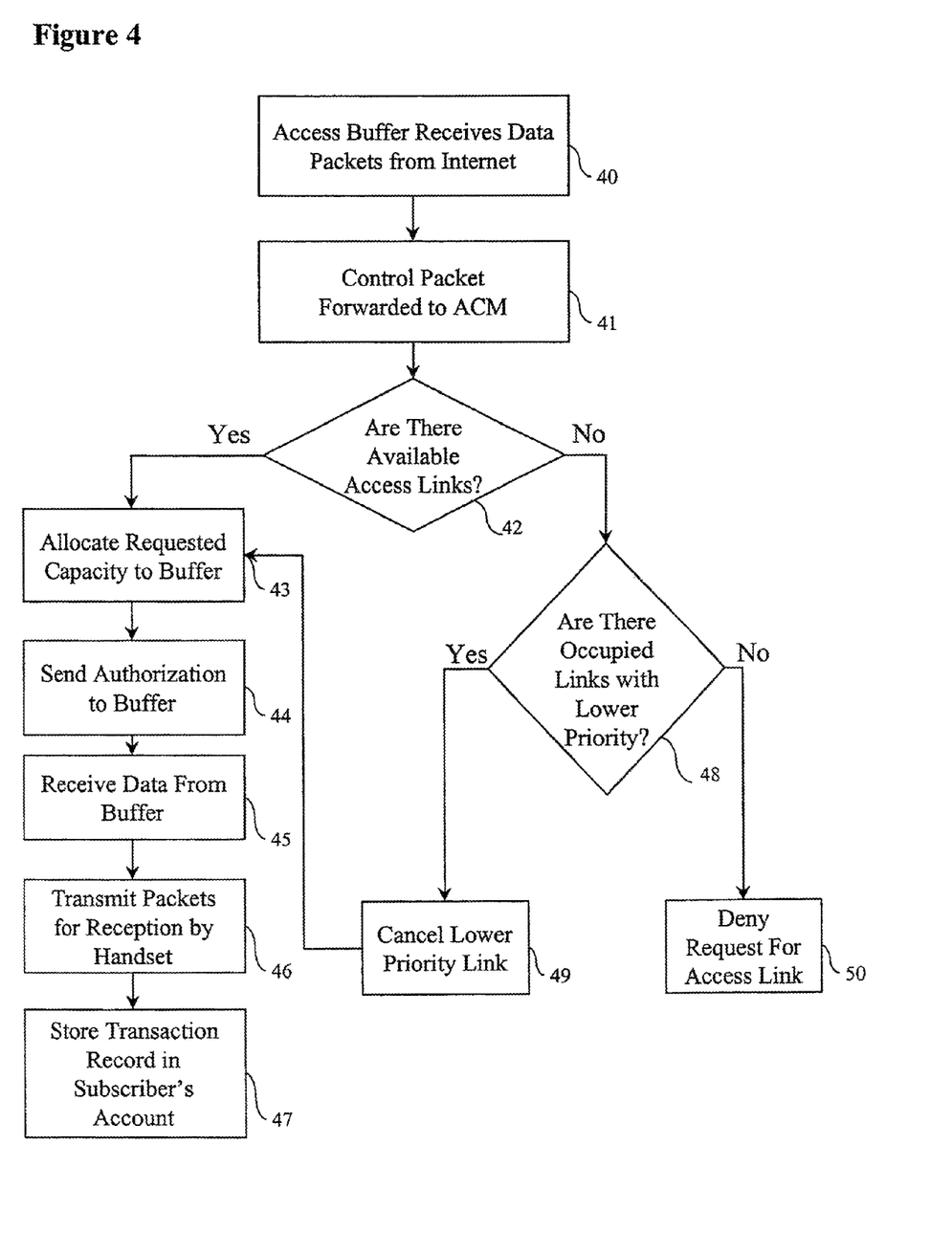
FIG. 4 is a flow diagram of the steps for allocating capacity on the wireless network for transmission of data packets to a wireless communications device according to the preferred embodiment of the present invention.

As shown in FIG. 4, the wireless network handles transmission of data packets that are incoming to the handsets from the internet in a similar manner to the outgoing transmission as described above. In step 40, the access buffer receives data packets from the internet. The control packet for this data is forwarded to the access control manager in step 41. The control manager then performs an evaluation of the existing capacity on the wireless network, in step 42. If there is an available access link, the requested capacity is allocated to the access buffer for the transaction, in step 43. An authorization signal is sent to the buffer in step 44, the data packets are forwarded to the cell tower in step 45, and the cell tower transmits the data packets over the wireless network for reception by the handset, in step 46.

When there are no available access links on the wireless network, the access control manager next evaluates in step 48 whether there are any access links that are transmitting packets for transactions of lower priority than the pending transaction request. The priority level designated in a control packet for a transaction in the access buffer can be forwarded by the sender over the internet, or it may be the default level for the type of application that corresponds with the data packets. If there is a lower priority transmission occurring, the access control manager discontinues the lower priority transaction in favor of a higher priority transmission, in step 49. Access is then granted to the access buffer according to steps 43-46, as previously described. If there is no lower priority transmission that is occurring, the access control manager denies the request by the buffer for an access link in step 50.

There are several possible configurations for re-requesting transmission of a transaction by either a handset or the access buffer after access is denied or discontinued. For handsets, each of these configurations are performed in the background of a handset's operation, during which time the handset can be used for other applications, including other transactions requiring wireless transmission of data.

In response to a denial of access for a transaction, the handsets in the network can be designed to send a new request for access after a given period of delay. Depending upon the congestion that is typically faced by the network, the new requests are transmitted after a few seconds, a minute, ten minutes, etc. If the handset is moved into a new cell site, the subsequent request after a period of delay is transmitted to the new cell tower, which may be operating at a different capacity level.

As an alternative to receiving repeated requests by the handsets and access buffer, the access control manager could broadcast a message after a period of time that describes the current capacity at each cell tower. The handsets that are denied access wait to send a request for an access link until the broadcast message is received. Once the broadcast message is received, the handsets send requests for access in accordance with the broadcast message.

An additional alternative is to provide an access request queue residing at the access control manager to register the denied handset requests. For each denied request, the access request queue stores the priority level for the requested transaction and an identity code for the handset. When access for the requested transaction becomes available, the access control manager sends an authorization to the handset to commence the transaction. If the handset has since been moved to a different cell site, the authorization signal is sent to the appropriate cell tower corresponding to the location of the handset.

The wireless network can also include a network traffic capacity monitor to inform users as to whether it is necessary to select a higher priority level to gain effective access for a transaction. Each time that the network evaluates whether there is capacity at a cell site for a transaction of a certain priority level, the access control manager pools all of the access links to determine the capacity on the network. This information can then be used for sending a broadcast message to the handsets. As an example, consider a network priority implementation that determines access based upon five priority levels. The access control manager might broadcast a warning message to handsets when the network has not accepted a level 3 communication for over five minutes. Continuing with this example, if a user is about to send an e-mail message at level 3, the handset can suggest that the user consider sending the message with a higher priority. Even if the broadcast message merely indicates whether a cell site is "at capacity," "busy," or "not busy," a user can benefit from this information in determining whether to wait before engaging in a wireless transaction.

To assist the user in monitoring workflow, the handsets can provide an indicator that shows the percentage of data packets that were transmitted from the queue. If a user is not satisfied with the current access level to the wireless network, the handset can reconfigure the control packet associated with the transaction to transmit the remaining packets in the queue with a higher priority level. For example, if a user unsuccessfully requested to transmit an e-mail message at a low priority level, the user may wish to upgrade the transmission of the e-mail at higher priority. Perhaps at the higher priority level, the access control manager will immediately transmit the remaining packets in the queue. Thus, the quality of service over the wireless network can be changed dynamically, during an individual transaction.

When access for all or part of a transaction has been denied, a user might instead decide to cancel the delivery. For example, if a majority of the packets for an e-mail has remained in the handset queue for a long time, the user may wish to cancel the e-mail and call the intended recipient instead. To incorporate this feature, the handset allows the user to access the queue. The user can choose to delete a transaction, remove the transaction from the queue, or reschedule a transmission of the transaction for a specific time.

Each application in the handsets is configured to be run at a certain one or more priority levels. An example is provided illustrating how available priority is configured for an e-mail application, a file transfer application, and voice-over-IP in FIGS. 5A, 5B, and 5C, respectively.

Figure 5A:
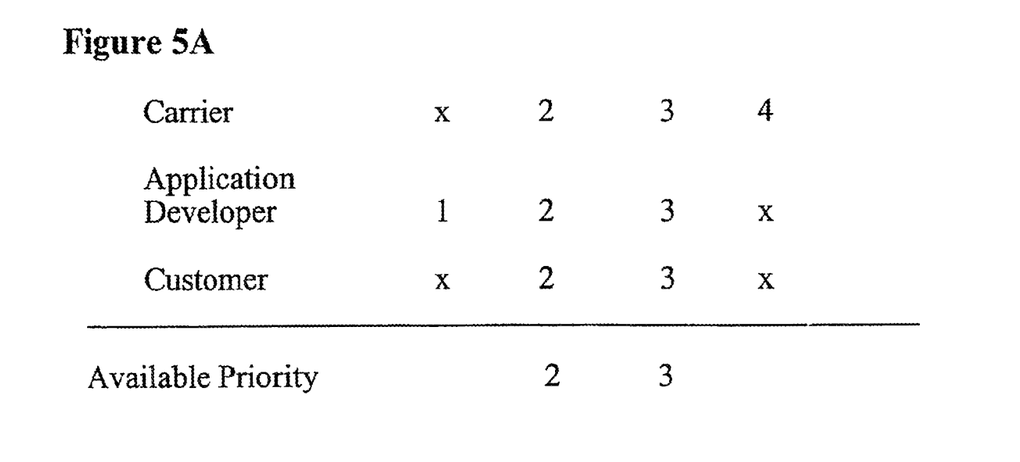
FIG. 5A is a chart of transmission priority levels allocated for an e-mail application by a network, a user application, and a consumer according to the present invention.

FIG. 5A provides an example of how the available priority levels may be determined for an e-mail application. The wireless network provider has four possible priority levels, and allows the e-mail to be transmitted at any of priority levels 2, 3, or 4 , with the default at level 3. In this example, the carrier/service provider does not allow level 1 priority for e-mail communications to reserve the bandwidth for voice communications. The application developer designed the e-mail application to send e-mails at any of the first three priority levels. Presumably, the lowest priority level is not available because the e-mail application cannot run effectively with low priority. The customer, as part of the service plan with the carrier provider, has pre-designated priority levels 2 and 3 for selection. It may be possible that the customer's service agreement provides for a certain number of e-mail transmissions at each of levels 2 or 3, perhaps as part of a fixed monthly fee. Considering the available priority levels common to the carrier, application developer, and customer, a user can select transmission of an e-mail along the wireless network designated as priority level 2 or 3.

Figure 5B:
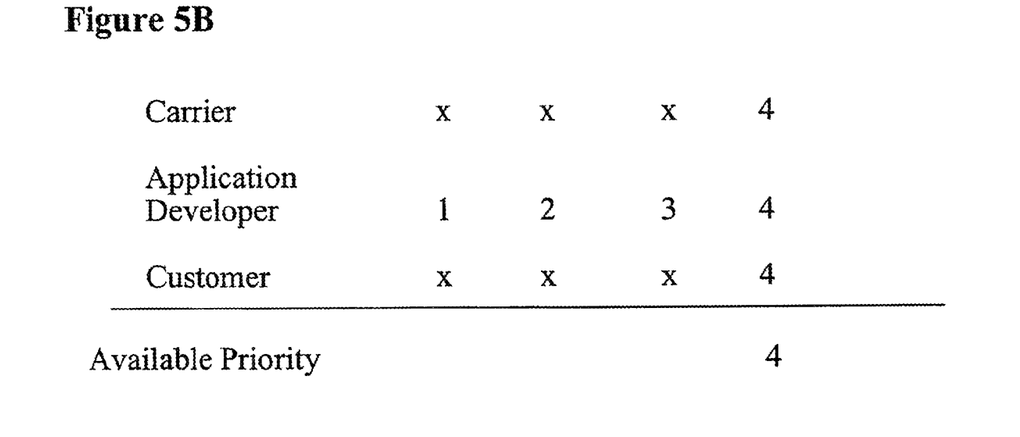
FIG. 5B is a chart of transmission priority levels allocated for a file transfer application by a network, a user application, and a consumer according to the present invention.

FIG. 5B provides an example of how the priority levels are determined for a bulk download of a large file or document from an internet web site. The wireless carrier only allows bulk file transfers to be configured as level 4 priority. Otherwise, the bulk download will overly tax the wireless servers, creating a delay for many other applications. The application developer designed its browser to allow file transfers at any of the priority levels. The customer, as part of the service plan with the carrier, can only pre-designate priority level 4 for selection. Accordingly, the file transfer is to be sent as level 4 priority.

Figure 5C:
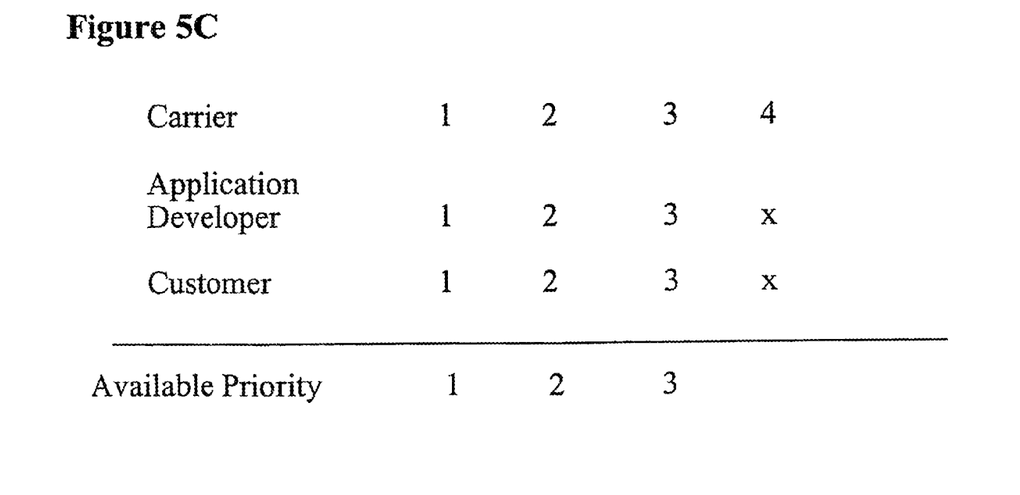
FIG. 5C is a chart of transmission priority levels allocated for a voice-over-IP application by a network, a user application, and a consumer according to the present invention.

FIG. 5C is an example of a configuration of priority levels for voice-over-IP telephony. The carrier allows voice traffic over the wireless network at any of the four priorities. However, in reality, an application developer can only implement voice-over-IP if the packets are transmitted over levels 1, 2, 1 or 3. Level 3 priority is actually only useful for voicemail, because the transmission of the data packets may be separated by a minute or more, which would be completely ineffective for a normal two-way speech conversation. The application developer configures the application with level 2 1 as the default. For one-way speech communications such as voice mail, the system could operate at a lower priority level by gradually reassembling or reconstructing the message as packets are received. The customer, who may wish to utilize voice-over-IP for telephony and voice mail services, preconfigures the system to allow a choice between levels 1, 2, or 3.

Figure 6A:
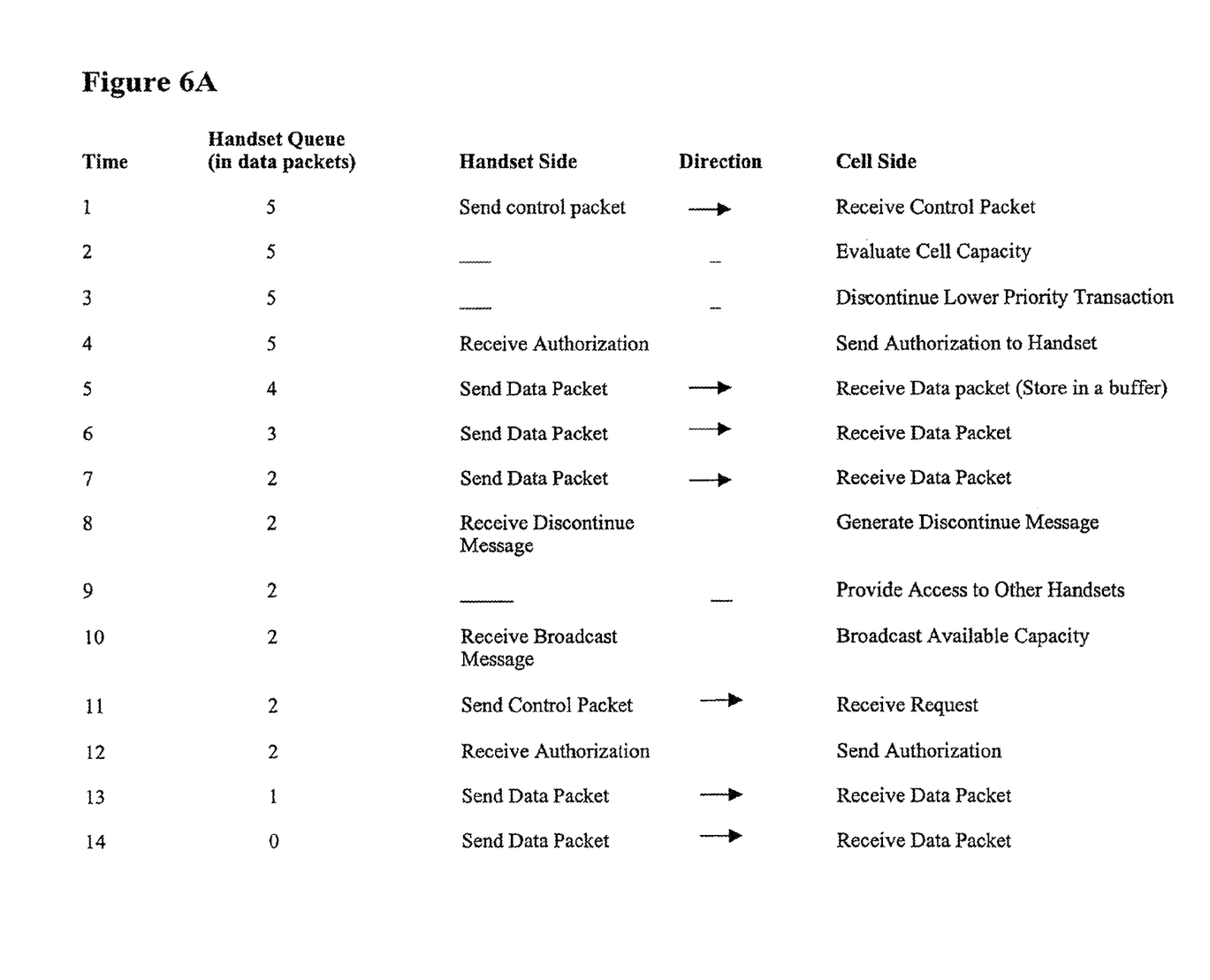
FIG. 6A is a table of steps for transmitting data packets across a wireless network for an e-mail application according to the preferred embodiment of the present invention.
Figure 6B:
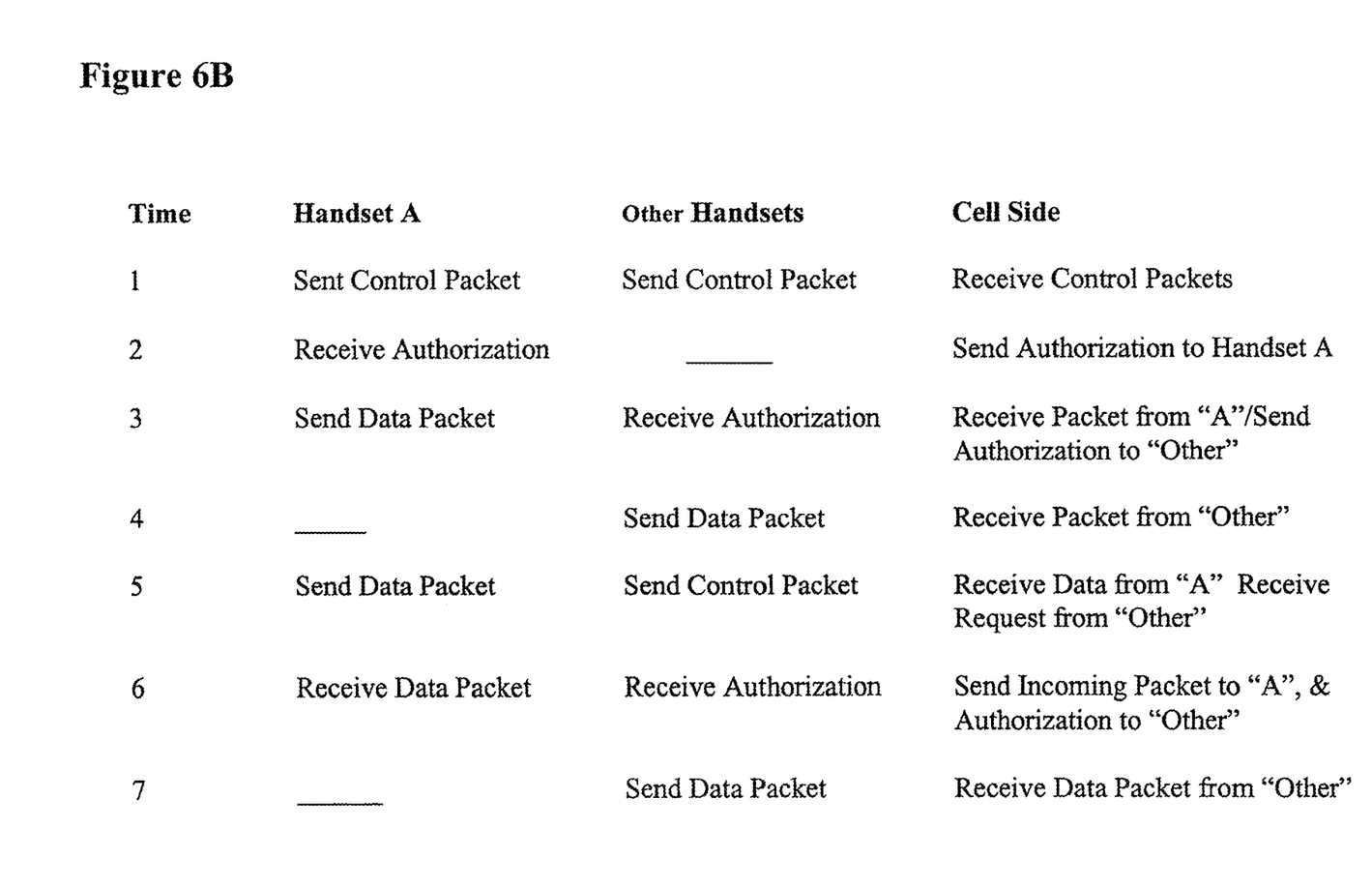
FIG. 6B is a table of steps for transmitting data packets across a wireless network for a voice-over-IP application according to the preferred embodiment of the present invention.

FIGS. 6A and 6B illustrate the transmission of data packets across the wireless network for an e-mail communication and a voice-over-IP communication, respectively. Because speech communications requires bi-directional data transmission, as opposed to transmission in a single direction, the wireless network allocates capacity differently for voice-over-IP, as opposed to e-mail or other unidirectional communications. Voice-over-IP is also different because the system needs to reserve capacity for transmission of a certain number of data packets per second in order to assure a reasonable speech quality.

FIG. 6A is a table illustrating the steps of transmitting an e-mail from a handset in the wireless network according to the preferred embodiment of the invention. In the example provided in this table, the e-mail has a level 2 priority, and the network is almost at full capacity. Because the e-mail is designated for level 2 priority, the communication can be temporarily discontinued if the network is at full capacity and the network receives a request for a higher priority transaction. In this example, the e-mail communication is composed of five data packets, stored in the queue. The communication is interrupted once in view of a higher priority transaction.

At time 1, the handset sends a control packet to the cell tower to request capacity for a level 2 priority communication. The access control manager evaluates the capacity at time 2, discontinues a lower priority transaction to allow for the email communication at time 3, and sends authorization to the handset at time 4. At times 5-7, the handset removes data packets of the e-mail communication from the handset queue for transmission over the wireless network. In the meantime, the cell side receives a request for a higher priority level 1 communication. Because the network is at full capacity at this time, the cell side generates a discontinue message to the handset at time 8, and provides access for another transaction at time 9. The network also completes another level 2 transaction at time 9, and broadcasts the available capacity for a level 2 communication at time 10. The handset sends a transmission request at time 11, receives authorization at time 12, and completes the transmission of the data packets for the e-mail communication at times 13 and 14. Both the handset queue side and the cell side require acknowledgement packets indicating receipt of data packets (not shown in FIG. 6A).

FIG. 6B is a table illustrating the steps of transmitting a bidirectional voiceover-IP communication in the wireless network according to the preferred embodiment of the invention. In the example provided in this table, the application has a level 1 priority. However, because the voice communications do not require constant transmission, a level 1 priority voice communication can be interrupted for short time periods, e.g., when there are gaps in the speech communication. Therefore, when the handset ("vocoder handset") periodically omits sending data packets, the capacity is filled by a transaction of a lower priority communication.

At time 1, the vocoder handset sends a control packet to request a level 1 priority voice communication. At time 2, the access control manager sends authorization to the vocoder handset to begin the voice communication. At time 3, the vocoder handset begins sending data packets for the transaction. At the same time, another handset receives authorization to transmit a data packet along the same access link. At time 4, the vocoder handset does not send a data packet, but another handset sends a data packet. At time 5 the vocoder handset resumes sending data packets, while yet another handset sends a request for a transaction. At time 6, the vocoder handset receives data packets from the internet. At the same time, the other handset receives authorization to initiate its transaction. At step 7, the vocoder handset again omits from sending a data packet, while the other handset begins sending data packets. This process can continue until the completion of the voice communication.

Figure 7:
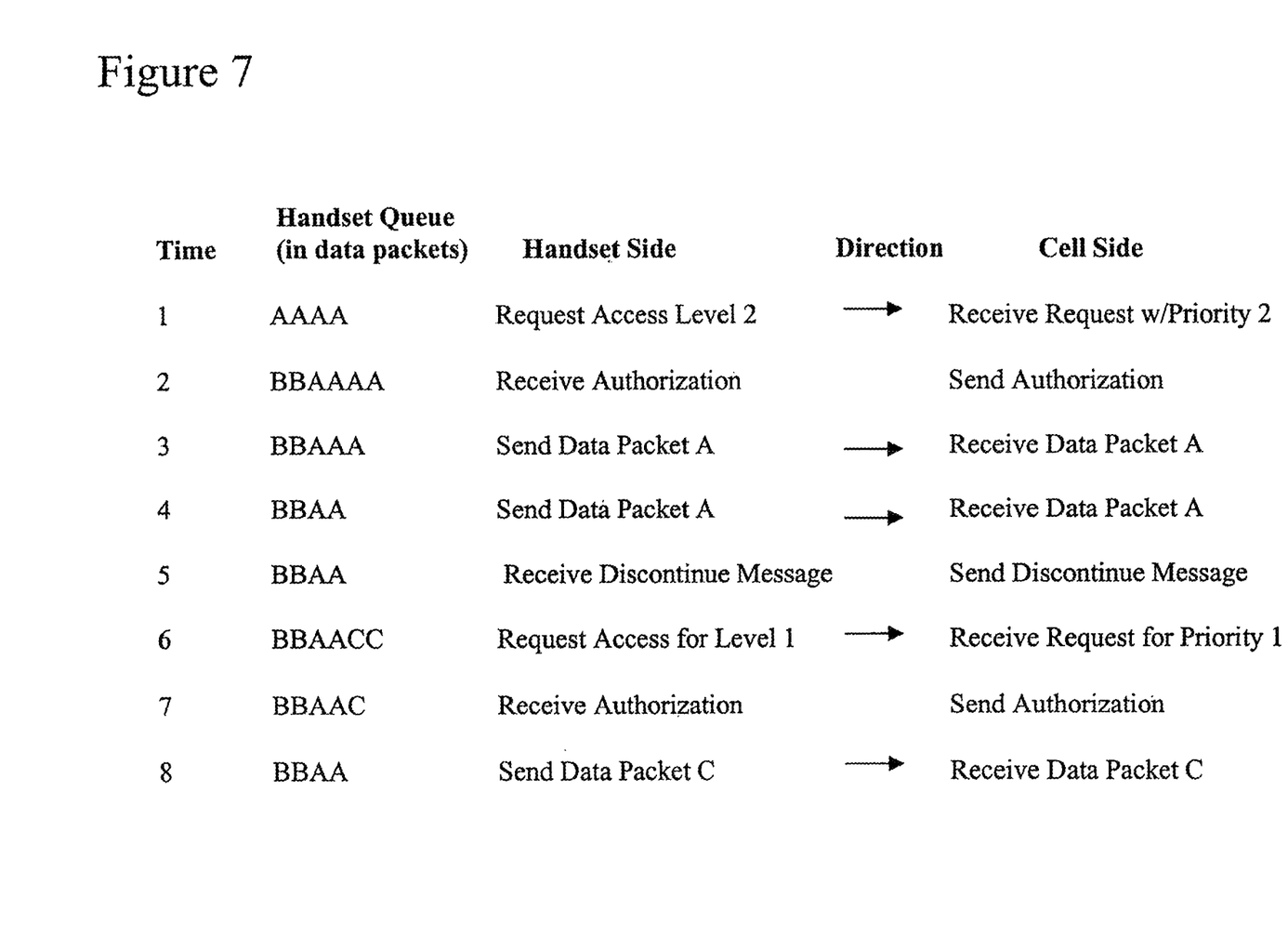
FIG. 7 is a table of steps for transmitting data packets across a wireless network from a plurality of user applications in a wireless communications device.

FIG. 7 provides another table illustrating the steps of transmitting data packets for several different transactions, of different priorities, generated in the same handset. In the table of FIG. 7, transaction "A is of priority level 2, transaction "B is of priority level 3, and transaction "C" is of priority level 1. Each occurrence of "A," "B," or "C" may represent a single data packet for that transaction, or a group of data packets from that transaction.

At time 1 in FIG. 7, the handset requests capacity to send data packets for a priority level 2 communication. The user has already generated the data to be transmitted and the handset has sent the data to the handset queue as data packets "A." The access control manager sends authorization for the transmission at time 2. At the same time, the handset places data packets "B" into the queue. Since data packets "B" are of a lower priority than data packets "A," the data packets "B" are at the end of the queue (from right to left). At times 3 and 4, the handset sends data packets "A" to the cell side. At time 5, the handset receives a discontinue message to step sending level 2 priority packets. The handset next places data packets "C" of level 1 priority into the queue at time 6, and requests access for a level 1 priority communication. The handset receives authorization to transmit at time 7, and sends data packet "C" at time 8. This operation continues until the queue is empty or the handset is turned off.

Thus, it is readily seen that the method and system of the present invention provides for improved access for transmission of data packets of transactions from a handset over a packet switched wireless network when many of the transactions are of differing levels of priority and urgency, and there is limited capacity on the wireless network. The system authorizes wireless communications devices to transmit and receive data packets until another request is received with higher priority. Within each handset, transactions that are pending are scheduled according to priority within the handset. This system allows for quality of service over the wireless network by allocating the resources according to urgency. The network will likely charge more for higher priority transactions.

The foregoing disclosure of embodiments of the present invention and specific examples illustrating the present invention have been presented for purposes of illustration and description. It is not intended to be exhaustive or to limit the invention to the precise forms disclosed. Many variations and modifications of the embodiments described herein will be obvious to one of ordinary skill in the art in light of the above disclosure. The scope of the invention is to be defined only by the claimed appended hereto, and by their equivalents.

What is claimed is:

1. An access control manager for allocating access to a wireless network, the access control manager comprising:
    an access request queue;
    a processor; and
    a memory storing computer-executable instructions that, when executed by the processor, cause the processor to perform operations comprising
        receiving, from a device, a first request for transmission of a first communication over the wireless network and a first priority associated with the first communication,
        determining that access to the wireless network at the first priority is available;
        in response to determining that access to the wireless network at the first priority is available, providing authorization to the device to transmit the first communication,
        after providing authorization to transmit the first communication and after transmission of a portion of the first communication, determining that access to the wireless network at the first priority is unavailable,
        registering the first request from the device with the access request queue,
        storing, at the access request queue, the first priority associated with the first communication of the first request and identification information associated with the device,
        determining that access to the wireless network at the first priority has been unavailable for an amount of time, and
        in response to determining that access to the wireless network at the first priority has been unavailable for the amount of time, providing a warning message that access to the wireless network at the first priority is unavailable.

2. The access control manager of claim 1, wherein the operations further comprise:
    after providing authorization to transmit the first communication, receiving a second request for transmission of a second communication over the wireless network and a second priority associated with the second communication, wherein the second priority corresponds to a higher priority than the first priority; and
    discontinuing transmission of the first communication associated with the first priority to allow transmission of the second communication associated with the second priority.

3. The access control manager of claim 2, wherein the operations further comprise providing authorization to transmit the second communication associated with the second priority in response to receiving the second request.

4. The access control manager of claim 1, wherein the operations further comprise:

discontinuing transmission of the first communication, after transmission of the first portion of the first communication, in response to determining that access to the wireless network at the first priority is unavailable; and receiving a second request for transmission of a remaining portion of the first communication over the wireless network and a second priority associated with the remaining portion of the first communication after providing the warning message, wherein the second priority corresponds to a higher priority than the first priority.

5. The access control manager of claim 4, wherein the operations further comprise providing authorization to transmit the remaining portion of the first communication associated with the second priority in response to receiving the second request.

6. The access control manager of claim 1, wherein determining that access to the wireless network at the first priority is available comprises:

identifying a second communication associated with a second priority being transmitted, wherein the second priority corresponds to a lower priority than the first priority; and discontinuing transmission of the second communication associated with the second priority to allow transmission of the first communication associated with the first priority.

7. The access control manager of claim 1, wherein the first request comprises a desired data rate, an acceptable delay, an estimated quantity of data to transmit, and the identification information of the device transmitting the first communication.

8. A method for allocating access to a wireless network, the method comprising:

receiving, at an access control manager, a first request for transmission of a first communication over the wireless network and a first priority associated with the first communication from a device;

determining, by the access control manager, whether access to the wireless network at the first priority is available;

in response to determining that access to the wireless network at the first priority is available, providing, by the access control manager, authorization to transmit the first communication;

after providing authorization to transmit the first communication and after transmission of a portion of the first communication, determining, by the access control manager, that access to the wireless network at the first priority is unavailable;

registering, by the access control manager, the first request from the device with an access request queue of the access control manager;

storing, by the access control manager at the access request queue, the first priority associated with the first communication of the first request and identification information associated with the device;

determining, by the access control manager, that access to the wireless network at the first priority has been unavailable for an amount of time; and in response to determining that access to the wireless network at the first priority has been unavailable for the amount of time, providing, by the access control manager, a warning message that access to the wireless network at the first priority is unavailable.

9. The method of claim 8, further comprising:
after providing authorization to transmit the first communication, receiving a second request for transmission of a second communication over the wireless network and a second priority associated with the second communication, wherein the second priority corresponds to a higher priority than the first priority; and discontinuing transmission of the first communication associated with the first priority to allow transmission of the second communication associated with the second priority.

10. The method of claim 8, further comprising providing authorization to transmit the second communication associated with the second priority in response to receiving the second request.

11. The method of claim 8, further comprising:
discontinuing transmission of the first communication, after transmission of the portion of the first communication, in response to determining that access to the wireless network at the first priority is unavailable; and receiving a second request for transmission of a remainder of the first communication over the wireless network and a second priority associated with the remainder of the first communication after providing the warning message, wherein the second priority corresponds to a higher priority than the first priority.

12. The method of claim 11, further comprising providing authorization to transmit the remaining portion of the first communication associated with the second priority in response to receiving the second request.

13. The method claim 8, wherein determining whether access to the wireless network at the first priority is available comprises:

identifying a second communication associated with a second priority being transmitted; and discontinuing transmission of the second communication associated with the second priority to allow transmission of the first communication associated with the first priority, wherein the first priority associated with the first communication corresponds to a higher priority than the second priority associated with the second communication.

14. The method of claim 8, wherein the first communication associated with the first priority comprises a speech communication.

15. The method of claim 8, wherein the first request comprises a desired data rate, an acceptable delay, an estimated quantity of data to transmit, and the identification information of the device transmitting the first communication.

16. A method for allocating access to a wireless network, the method comprising:

receiving, at an access control manager, a first request for transmission of a first communication over the wireless network and comprising a first priority associated with the first communication;

identifying, by an access control manager, a second communication associated with a second priority being transmitted;

discontinuing, by the access control manager, transmission of the second communication associated with the second priority after transmission of a portion of the second communication to allow transmission of the first communication associated with the first priority, wherein the first priority associated with the first communication corresponds to a higher priority than the second priority associated with the second communication;

registering, by the access control manager, a request associated with the second communication with an access request queue associated with the access control manager;

storing, by the access control manager at the access request queue, the second priority associated with the second communication of the request and identification information associated with a device corresponding to the second communication;

determining, by the access control manager, that access to the wireless network at the second priority has been unavailable for an amount of time; and in response to determining that access to the wireless network at the second priority has been unavailable for the amount of time, providing, by the access control manager, a warning message indicating a necessity to select a priority higher than the second priority to gain access to the wireless network.

17. The method of claim 16, further comprising:

after discontinuing transmission of the second communication, providing authorization to transmit the first communication;

after providing authorization to transmit the first communication, determining that access to the wireless network at the first priority is unavailable;

discontinuing transmission of the first communication associated with the first priority in response to determining that access to the wireless network at the first priority is unavailable; and in response to discontinuing transmission of the first communication associated with the first priority, receiving a second request for transmission of the first communication over the wireless network and a third priority associated with the first communication, wherein the third priority corresponds to a higher priority than the first priority.

18. The method of claim 16, further comprising after providing the warning message, receiving a second request for transmission of a remaining portion of the second communication over the wireless network and comprising a third priority associated with the remaining portion of the second communication, wherein the third priority is at least higher than the second priority.

19. The method of claim 16, wherein the first communication associated with the first priority comprises a speech communication.

20. The method of claim 16, wherein the first request comprises a desired data rate, an acceptable delay, an estimated quantity of data to transmit, and identification information of a device transmitting the first communication.

* * * * *